L. & H. L. BRADLEY.
COMBINED MOTOR STARTING AND RELEASING MECHANISM FOR ALTERNATING CURRENT MOTORS.
APPLICATION FILED AUG. 11, 1916.
1,280,147.
Patented Oct. 1, 1918.
4 SHEETS—SHEET 1.
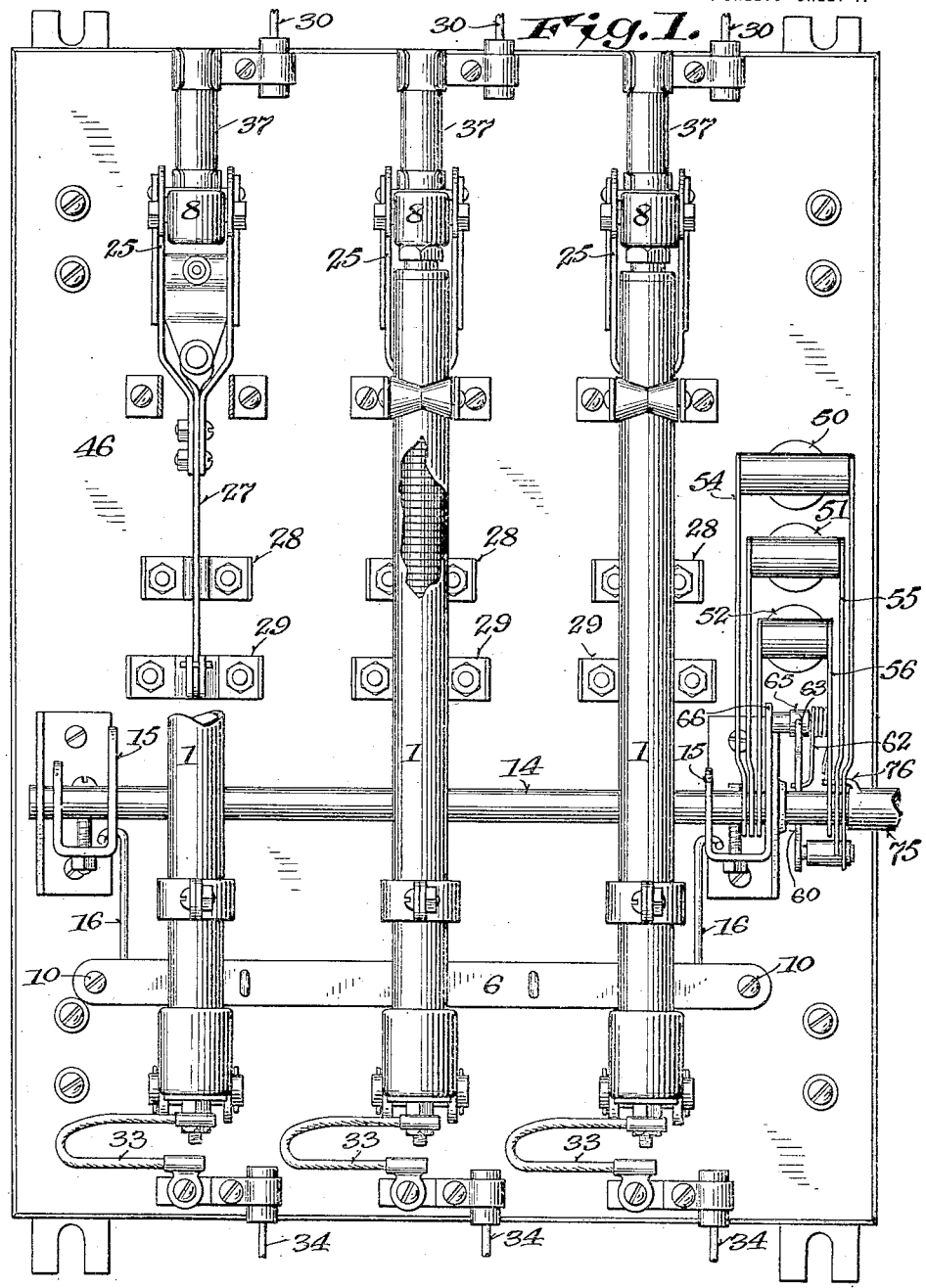

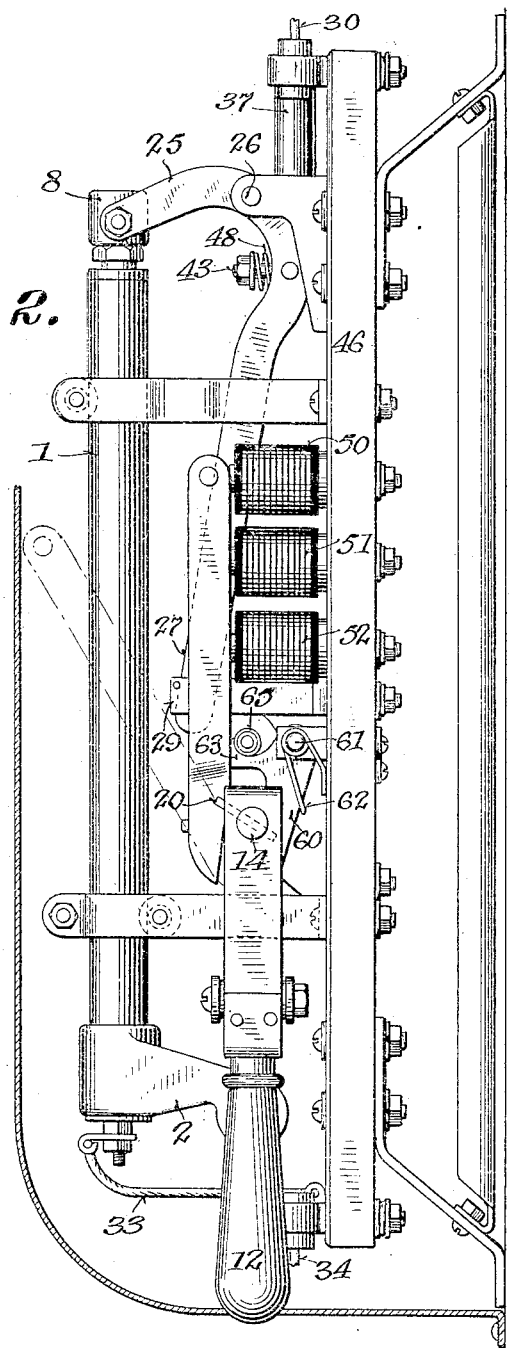

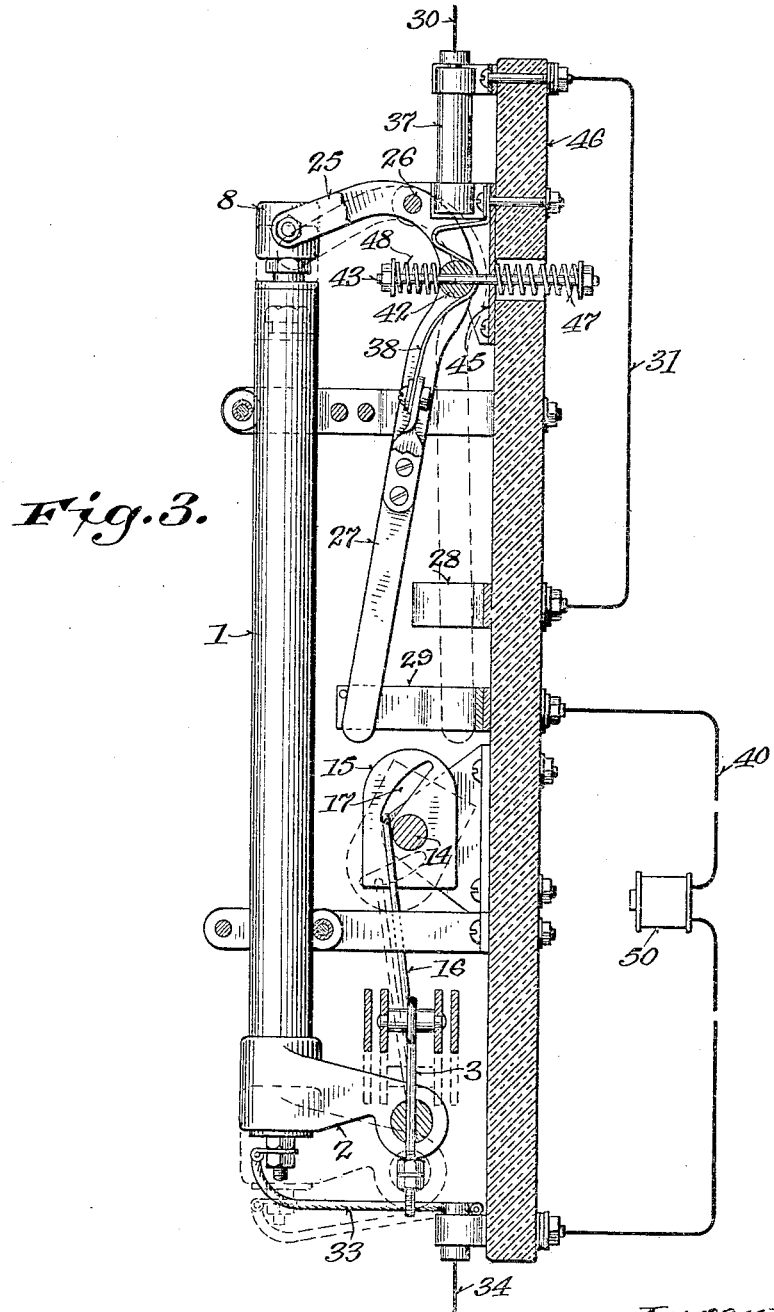

L. & H. L. BRADLEY.
COMBINED MOTOR STARTING AND RELEASING MECHANISM FOR ALTERNATING CURRENT MOTORS.
APPLICATION FILED AUG. 11, 1916.
1,280,147.
Patented Oct. 1, 1918.
4 SHEETS—SHEET 4.
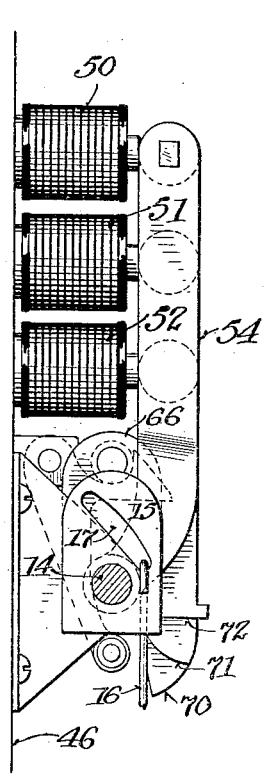
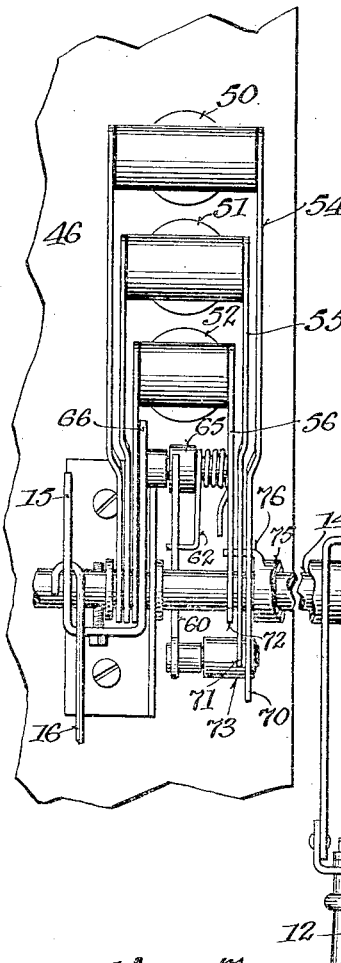
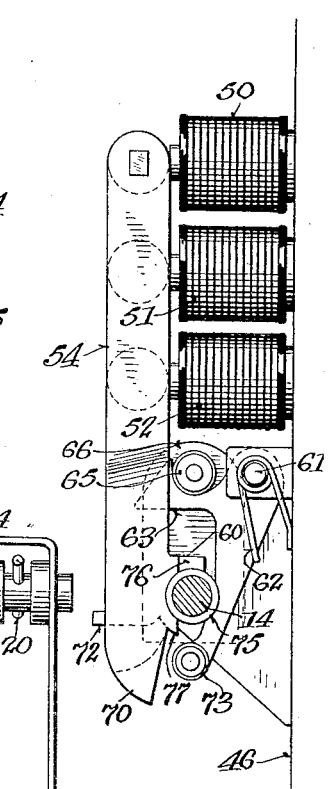

ns of Letters Patent.  Patented Oct. 1, 1918.

UNITED STATES PATENT OFFICE.

LYNDE BRADLEY AND HARRY L. BRADLEY, OF MILWAUKEE, WISCONSIN.

COMBINED MOTOR STARTING AND RELEASING MECHANISM FOR ALTERNATING-CURRENT MOTORS.

1,280,147. Specification of Letters Patent. Patented Oct. 1, 1918.

Original application filed August 14, 1913, Serial No. 784,661. Divided and this application filed August 11, 1916. Serial No. 114,309.

*To all whom it may concern:*

Be it known that we, LYNDE BRADLEY and HARRY L. BRADLEY, citizens of the United States, residing at Milwaukee, county of Milwaukee, and State of Wisconsin, have invented new and useful Improvements in Combined Motor Starting and Releasing Mechanisms for Alternating-Current Motors, of which the following is a specification.

Our invention relates to improvements in combined motor starting and releasing mechanisms for alternating current motors and is a division of our former application filed August 14, 1913, Serial No. 784,661, and upon which Letters Patent No. 1,220,721, dated March 27th, 1917, have been issued.

The object of our invention is to provide a releasing mechanism peculiarly adapted for use in connection with a rheostat in controlling the multiphase currents of an alternating current motor in such a manner that the operation of adjusting the rheostat for motor starting purposes will simultaneously adjust a series of underload magnetic trips in circuit maintaining relation, the arrangement being such that interruption of the current in any one phase or line of conduction will automatically cause a complete interruption in all circuits and not only prevent continued operation of the motor under single phase overload conditions but restore all controlling elements, including the full or maximum resistance of the rheostat, to a normal no-current condition, whereby after restoration of the multiphase circuit conditions said mechanism may be readjusted to circuit closing position by the simple manual act of operating a starting lever with which the release mechanism is associated for operation.

In the drawings—

Figure 1 is an elevation of a starting controller embodying our invention and in which compressible resistance columns are employed to control the current supply during the starting interval, two of said columns being partially broken away, the casing being removed.

Fig. 2 is a side elevation of the same, showing the casing in section.

Fig. 3 is a sectional view drawn to a plane perpendicular to the back and including one of the columns, but showing the latter and fuse 37 in full.

Fig. 4 is a detail view of a set of release magnets and latch releasing mechanism controlled thereby.

Fig. 5 is a front elevation of the same, showing a portion of the starting lever.

Fig. 6 is a side elevation of the same viewed from the opposite side from that shown in Fig. 4.

Fig. 7 is a detail plan view of the evener bar which carries the compressible resistance columns.

Like parts are identified by the same reference characters throughout all the views.

In Figs. 1 to 7 inclusive, our release mechanism is illustrated in connection with a motor starter embodying compressible resistance columns of the general type shown in former Patents No. 1,051,480, dated January 28, 1913; No. 821,697, dated May 29, 1906; and No. 723,817, dated March 31, 1903. In the construction herein illustrated, the resistance columns 1 are provided with arms 2 at their lower ends, and rods 3, connected with said arms, are adapted to support the columns from a set of evener bars 4, 5 and 6, said evener bars being lifted to apply pressure to the columns by lifting them against a stop 8. The evener bars are preferably arranged in pairs, as shown, and the outer bars 6 are connected at their respective ends by cross pins or bolts 10. Motion is transmitted to the evener bars from a manually actuated lever 12, (Fig. 2), through a rock shaft 14, slotted cam plates 15, fast on said shaft, and links 16 engaged in the slots 17 in the cam plates and connected with the evener cross bolts 10. The actuating lever 12 is loose on shaft 14 but transmits motion to the shaft through shaft cross pin 20, which the short arm of the lever engages when said lever is swung upwardly from normal position. By employing this pin, the lever may be permitted to drop to normal position after oscillating shaft 14 to column-compressing position, and this retractive movement of the lever may take place without moving the shaft 14 from the position to which it has been adjusted by the upward movement of the lever.

The initial upward movement of the columns 1 when actuated by the lever 12, as above explained, brings each column into contact with a stop 8 which is connected with a switch lever 25 pivoted to the frame at 26, and having an arm 27 of the knife type adapted to operate between resilient contacts 28 and 29. When this switch arm 27 is in engagement with contacts 28, (its normal no-current position), a circuit may be established through the columns as soon as they are lifted against stop 8, from line 30, through connection 31, contacts 28, the switch lever, stops 8, and the resistance columns to the motor connections 33 and 34. Continued pressure upon the columns, however, actuates the respective stops 8, each of which communicates its motion to the corresponding lever 25, causing the switch arm of the lever to swing outwardly from contacts 28 into engagement with contacts 29, the contacts 29 being sufficiently separated at their inner ends so that they will not be engaged by said lever until the lever moves outwardly to the position in which it is clearly shown in Fig. 3. A circuit will then be established from fuse 37, conducting member 38, switch arm 27, contacts 29, and motor connections 40 and 34, thus cutting out the resistance columns 1. The switch lever 25 is preferably double and carries a cross pin or spacer 42. A rod 43 extends through this member 42 and through a plate 45 mounted upon the slate backing 46. A spring 47 is coiled upon the rod 43 in the rear of plate 45, and another spring 48 is coiled upon this rod in front of the member 42. These springs tend to force the member 42 downwardly and restore the lever 25 and its switch arm 27 to normal no-current position as soon as the pressure of column 1 upon stop 8 is relieved.

It has already been explained that the position of the lever 25, which is termed the normal no-current position, is also the starting position of the lever and that during the starting period a circuit is established through the contacts 28, the lever, and the resistance column to the motor. This circuit, however, is broken as soon as the columns 1 drop away from contact 8. This starting circuit is only established for a few seconds, constituting the motor starting interval, and until the lever arm 27 is moved from contacts 28 to contacts 29, whereby the current is shunted past the column 1. For reasons hereinafter explained, the return of lever 25 to said normal position of contact with terminals 28 is followed by an instant separation of column 1 from contact 8, thus breaking the circuit.

The construction illustrated shows three columns 1, each of which is connected up in a three-phase circuit, affording three lines of conduction. Each of these lines of conduction includes an electromagnet 50, 51 and 52 respectively, and these three electromagnets are preferably arranged in a vertical set or row. Armatures 54, 55 and 56 are pivotally hung upon the shaft 14 and are adapted respectively to swing into and out of contact with the poles of the magnets 50, 51 and 52. When these armatures are swung into contact with the magnetic poles, they will be held in the raised position illustrated by full lines in Fig. 2 in case the magnets are energized. If any one of the magnets becomes deënergized, its armature will immediately drop by gravity to the position indicated by dotted lines in Fig. 2, and in so doing, will release a trip latch 60 which holds the columns in raised position in pressure contact with stop 8. By thus actuating the trip latch 60, the columns 1 are permitted to drop, whereupon the reaction of springs 47 and 48 actuates lever 25 to normal no-current position, the circuit through the columns being simultaneously broken as the columns drop away from stop 8.

The trip latch 60 is pivoted at 61 to the frame. A spring 62 tends to hold it with latch hook 63 in position of use, as best shown in Fig. 6. In this position it is adapted to engage a roller 65 carried by an arm 66, (Fig. 5), of the yoke-shaped cam plate 15. When the lever 12 is swung upwardly to oscillate shaft 14 and lift the columns 1, as above explained, the arm 66 of the cam plate carries roller 65 into position for engagement and retention by the latch hook 63. The latch hook will be depressed by the pressure of the roller, but as soon as the roller has passed the hook, it swings upwardly to roller retaining position by reaction of spring 62. When in this position, the columns will have been lifted sufficiently to not only compress them against stop 8 and progressively reduce their resistance, but also to actuate stop 8 against the tension of springs 47 and 48, and move lever 25 to short circuiting position.

Should the current be interrupted in any one phase, one of the magnets 50, 51 or 52 will, of course, be deënergized and the corresponding armature 54, 55 or 56 will be permitted to drop. The lower extremity 70, 71 or 72 of the dropping armature will, after the armature has acquired momentum, be brought into contact with a roller 73 carried by a downwardly projecting arm of the latch member 60. The pressure of the dropping armature drives this arm backwardly and depresses the latch hook 63, releasing roller 65, whereupon the weight of the parts and the reactionary pressure of the columns 1 oscillates shaft 14 through the downward pull exerted on links 16, all the parts being thus restored to normal no-current position.

To restore the circuits to normal working position, it is therefore necessary to again lift the lever 12. A sleeve 75, carried by the lever 12, is provided with an arm 76 which projects in a position to engage shoulders 77 on the respective armatures 54, 55 and 56. When the lever 12 is lifted, its motion is transmitted through sleeve 75 and arm 76 to swing these armatures upwardly into contact with the poles of the magnets 50, 51 and 52 respectively. In transmitting motion from sleeve 75 to lift the armatures, arm 76 loosely engages the projections 70, 71 and 72 and pushes them downwardly to the position in which they are shown in Fig. 5 after which the lever 12 may be permitted to drop, thereby oscillating sleeve 75 in the opposite direction until projection 76 reaches the position in which it is shown in said Fig. 5. This movement will take place coincidently with the compression of the columns 1 and the subsequent movement of switch lever 25. Therefore, if the circuit in each phase has been restored, the armatures will be held by the magnets in raised position. Latch hook 63 will have reëngaged roller 65. Lever 12 may be permitted to drop with working conditions restored, and such conditions will be maintained until the current is interrupted in one or more of the circuits.

The object of the slots 17 in the cam plates 15 is to secure a graduated movement and increase of pressure upon the columns 1 in conformity with the requirements. When the columns are depressed, as indicated by dotted lines in Fig. 3, the links 16 will engage in the outer ends of the slots 17, and the initial movement of the columns will therefore be rapid. But as cam plate 15 moves upwardly, the links will slide toward the ends of the slots nearest shaft 14 with progressive retardation of the movement, although lever 12 may be moving continuously at the same speed.

It will be observed that during the motor starting period the fuses 37 are protected by the connection 31 across the fuses to the contacts 28 and through these to lever 27. A portion of the current will, of course, pass through the fuses and through contact member 38 to the switch lever 27 but this will represent only a small portion of the current, since the resistance of the fuses is considerable. We attach great importance to this feature, since otherwise the fuses would be burned out during the motor starting period, particularly in small units where it is customary to omit the rheostat. By our improvement, however, the fuses are protected until the motor has acquired sufficient speed to control the flow of current by the induced counter electromotive force at which time the switches 27 will be closed to the contacts 29. It will, of course, be understood that if the resistance elements of the members 1 are omitted, these members or equivalent rods will still be used to mechanically actuate the switches 27.

We claim—

1. The combination with a set of polyphase conductors of an electrical circuit, of a movable support, circuit closing devices operated therefrom to simultaneously close the circuit through said conductors and each including a rheostat, a locking device adapted to hold the support in circuit closing position, a set of lock releasing devices, each controlled as to operation, by the current in one phase of said circuit.

2. The combination with a set of polyphase conductors of an electrical circuit, of a movable support, a set of resistance columns mounted thereon, movable electrodes, one in the path of each column and adapted to be actuated when the support is moved to bring said columns into contact with the respective electrodes, a set of switch levers, each having an operating arm connected with one of said electrodes and adapted to be actuated thereby, each of said levers being adapted in normal position, to connect up its said electrode as a one phase terminal, and each of said levers when actuated by the pressure of its respective resistance column, being adapted to establish a shunt around said column.

3. The combination with a set of polyphase conductors of an electrical circuit, of a set of switch levers each controlling one phase of said circuit, and normally constituting one terminal thereof, a set of variable resistance columns each having relative movement into and out of actuating relation to one of the switches and constituting a terminal of opposite polarity in said phase, and relatively fixed terminals each adapted to be engaged by one of the switches when actuated out of normal position, said relatively fixed terminals being included in shunt circuits around the respective columns.

4. The combination with a set of polyphase conductors of an electrical circuit, of a set of switch levers each controlling one phase of said circuit, and normally constituting one terminal thereof, a set of variable resistance columns each having relative movement into and out of actuating relation to one of the switches and constituting a terminal of opposite polarity in said phase, and relatively fixed terminals each adapted to be engaged by one of the switches when actuated out of normal position, said relatively fixed terminals being included in shunt circuits around the respective columns, and said switch levers being each provided with a retracting spring adapted to resist the actuating movement of the column with sufficient force to allow the necessary reduction in the resistance of the column before the lever is actuated to shunt position.

5. The combination with a set of polyphase conductors of an electrical circuit, of a set of switch levers each controlling one phase of said circuit, and normally constituting one terminal thereof, a set of variable resistance columns each having relative movement into and out of actuating relation to one of the switches and constituting a terminal of opposite polarity in said phase, and relatively fixed terminals each adapted to be engaged by one of the switches when actuated out of normal position, said relatively fixed terminals being included in shunt circuits around the respective columns, and said switch levers being each provided with a retracting spring adapted to resist the actuating movement of the column with sufficient force to allow the necessary reduction in the resistance of the column before the lever is actuated to shunt position, means for locking said levers in shunt position against the tension of their retracting springs, automatic lock releasing mechanism, and electro-magnetic means included in the shunt circuit, for preventing the operation of the lock releasing mechanism.

6. The combination with a set of polyphase conductors of an electrical circuit, of a set of switch levers each controlling one phase of said circuit, and normally constituting one terminal thereof, a set of variable resistance columns each having relative movement into and out of actuating relation to one of the switches and constituting a terminal of opposite polarity in said phase, and relatively fixed terminals each adapted to be engaged by one of the switches when actuated out of normal position, said relatively fixed terminals being included in shunt circuits around the respective columns, together with means for retaining said levers in shunt circuit position, and electromagnetic means included in said shunt circuits for preventing the return of said levers to normal position.

7. The combination with a set of polyphase conductors of an electrical circuit, of a set of switch levers each controlling one phase of said circuit, and normally constituting one terminal thereof, a set of variable resistance columns each having relative movement into and out of actuating relation to one of the switches and constituting a terminal of opposite polarity in said phase, and relatively fixed terminals each adapted to be engaged by one of the switches when actuated out of normal position, said relatively fixed terminals being included in shunt circuits around the respective columns, together with electro-magnetic means for retaining said levers in shunt circuit position, adapted when the current is interrupted in any one phase, to release all of said levers and allow them to return to normal position.

8. The combination with a set of polyphase conductors of an electrical circuit, of a set of switch levers, each controlling one phase of said circuit, and normally constituting one terminal thereof, a set of variable resistance columns, each having relative movement into and out of actuating relation to one of the switches, and constituting a terminal of opposite polarity in said phase, relatively fixed terminals each adapted to be engaged by one of the switches when actuated out of normal positon, and each providing means for establishing a shunt circuit through the switch and around the column, springs for retracting the switches, a latch for locking all the columns with the switches held in shunt position against the tension of the springs, latch releasing mechanism, one for each phase, and each dependent, as to releasing operations, upon the current condition in said phase, independently of the conditions in the other phases.

9. The combination with a set of polyphase conductors of an electrical circuit, of a movable support, automatic circuit breakers arranged to be mechanically operated therefrom to simultaneously close the circuit through said conductors, a locking device adapted to hold the support in circuit closing position, a set of automatically acting lock releasing mechanisms, and electromagnetic devices, one for each phase, and each adapted to prevent a releasing operation of one of the lock releasing mechanisms until the current falls below normal in the phase to which it pertains, said circuit breakers being each provided with means for connecting up one phase of the circuit through a rheostat.

10. The combination with a set of polyphase conductors of an electrical circuit, of a movable support, a circuit closing and breaking device operated therefrom to simultaneously close the circuit through said conductors, a locking device adapted to hold the support in circuit closing position, lock releasing mechanism, and means for electrically controlling the operation of the lock releasing mechanism from each phase of the circuit, said circuit closing and breaking devices each including a means for inserting, gradually reducing, and finally cutting out a resistance from said circuit in direct connection with the operation of the circuit closing devices.

11. A motor starter including the combination with a set of polyphase conductors of an electrical circuit, of a set of fuses, one for each phase, a set of switch levers, means for normally utilizing said levers to establish a shunt circuit around the fuses, and means for simultaneously actuating said levers to establish the circuit of each phase through one of the fuses, and means for automatically restoring all of said levers to normal position in case of a current interruption in any one phase.

12. A motor starter including the combination with a set of polyphase conductors of an electrical circuit, of a set of fuses, one for each phase, a set of switch levers, means for normally utilizing said levers to establish a shunt circuit around the fuses, and means for simultaneously actuating said levers to establish the circuit of each phase through one of the fuses, together with latch mechanism for holding the lever actuated means in actuating position, and a set of underload trip magnets, one for each phase, and included in circuit thereof and each adapted, when deënergized, to release the lever mechanism and allow the levers to return to normal shunt circuit position.

13. A motor starter including the combination with a set of polyphase conductors of an electrical circuit, of a set of fuses, one for each phase, means for establishing a shunt circuit in each phase around the fuse, a starting lever, means actuated by the starting lever, during its final movement, for breaking said shunt circuit and establishing the circuit of each phase through the fuse, latch mechanism adapted to maintain the phase circuit through the respective fuses while the normal current conditions are maintained in all fuses, and a set of electromagnetic devices, one included in each fuse, and each adapted, when deënergized, to release the latch mechanism, and means for breaking the circuit in all phases when the latch mechanism is released.

14. The combination with a set of polyphase conductors of an electrical circuit, of a motor starting lever for connecting up said conductors with an electric motor, a set of fuses, one for each phase conductor, means for normally establishing a shunt in the phase, across the fuse pertaining thereto, and means controlled by the motor starting lever for breaking said shunt circuits and including each phase in circuit with the motor, together with means for automatically breaking all the phase circuits and simultaneously reëstablishing said shunt circuits when the circuit is interrupted in any one phase.

15. The combination with a set of polyphase conductors of an electrical circuit, of a motor starting lever for connecting up said conductors with an electric motor, a set of fuses, one for each phase conductor, means for normally establishing a shunt in the phase across the fuse pertaining thereto, means controlled by the motor starting lever for breaking said shunt circuits and including each fuse in circuit with the motor, latch mechanism adapted to maintain each fuse in its respective phase circuit under normal current conditions, a set of automatically acting latch releasing mechanisms, one for each phase, and an electro-magnetic device included in each phase and adapted, under normal current conditions to prevent the operation of any of the latch releasing mechanisms.

16. The combination with a set of polyphase conductors of an electrical circuit, of a motor starting lever for connecting up said conductors with an electric motor, a set of fuses, one for each phase conductor, means for normally establishing a shunt in the phase across the fuse pertaining thereto, means controlled by the motor starting lever for breaking said shunt circuits and including each phase in circuit with the motor, latch mechanism adapted to maintain each fuse in its respective phase circuit under normal current conditions, a set of automatic acting latch releasing mechanisms, one for each phase, and an electro-magnetic device included in each phase and adapted, under normal current conditions, to prevent the operation of any of the latch releasing mechanisms, said motor starting lever being provided with connections, adapted, during a motor starting movement of said lever, to include each of said electro-magnetic devices in the circuit of its respective phase.

In testimony whereof we affix our signatures in the presence of two witnesses.

LYNDE BRADLEY.
HARRY L. BRADLEY.

Witnesses:
CHESTER D. BAIRD,
ERWIN J. EGGERT.

Copies of this patent may be obtained for five cents each, by addressing the "Commissioner of Patents, Washington, D. C."